United States Patent
Junk

(10) Patent No.: US 9,126,813 B2
(45) Date of Patent: Sep. 8, 2015

(54) CONTAINER FILLING DEVICE

(75) Inventor: Martin Junk, Tholey (DE)

(73) Assignee: Hamba Filltec GmbH & Co. KG, Saarbruecken (DE)

( * ) Notice: Subject to any disclaimer, the term of this patent is extended or adjusted under 35 U.S.C. 154(b) by 325 days.

(21) Appl. No.: 13/468,715

(22) Filed: May 10, 2012

(65) Prior Publication Data

US 2013/0118863 A1 May 16, 2013

(30) Foreign Application Priority Data

May 25, 2011 (DE) .......................... 10 2011 103 152

(51) Int. Cl.
*B65G 35/08* (2006.01)
*B67C 3/24* (2006.01)
*B65B 43/52* (2006.01)
*B65B 43/54* (2006.01)
*B65B 65/02* (2006.01)

(52) U.S. Cl.
CPC . *B67C 3/24* (2013.01); *B65B 43/52* (2013.01); *B65B 43/54* (2013.01); *B65B 65/02* (2013.01); *B65G 35/08* (2013.01)

(58) Field of Classification Search
CPC ...................................................... B65G 35/08
USPC ........ 198/465.1, 465.3, 468.6, 867.11, 803.2, 198/795
See application file for complete search history.

(56) References Cited

U.S. PATENT DOCUMENTS

| 1,830,337 | A | * | 11/1931 | Rossner ............................ 63/15 |
| 4,633,998 | A | | 1/1987 | Norfolk |
| 5,090,555 | A | * | 2/1992 | Kura ........................... 198/465.1 |
| 6,170,634 | B1 | | 1/2001 | Jaquet |
| 6,431,227 | B1 | | 8/2002 | Ter Haar |
| 6,494,142 | B2 | * | 12/2002 | Masugaki et al. ............ 104/168 |
| 7,500,435 | B2 | | 3/2009 | Bartlett, Jr. et al. |
| 2006/0070850 | A1 | | 4/2006 | Hartness et al. |
| 2010/0044188 | A1 | | 2/2010 | Kim |

FOREIGN PATENT DOCUMENTS

| DE | 200 10 791 U1 | 12/2000 |
| DE | 698 03 456 T2 | 9/2002 |
| DE | 10 2006 034 492 A1 | 1/2008 |
| DE | 10 2008 062 357 B4 | 10/2010 |
| EP | 0475827 | 3/1992 |
| EP | 1 029 815 A1 | 1/2000 |

(Continued)

*Primary Examiner* — Gene Crawford
*Assistant Examiner* — Lester Rushin
(74) *Attorney, Agent, or Firm* — Von Rohrscheldt Patents

(57) ABSTRACT

A device for filling containers, comprising: an upper main element, a lower main element and lateral elements connecting the upper main element and the lower main element;

support elements arranged at one another without a continuous drive device, which support elements are continuously run through the device along operating stations and along the main elements and whose interconnection with one another due to a support along at least one lateral element is disengaged, wherein the interconnection of the support elements with one another in the upper main element and/or in the lower main element is maintained over the entire movement path along the top main element and the bottom main element, and wherein the movement of the support elements in the upper main element and/or in the lower main element is acceleratable and deceleratable in a controlled manner with the interconnection of the support elements being maintained.

13 Claims, 4 Drawing Sheets

(56) References Cited

FOREIGN PATENT DOCUMENTS

| | | | |
|---|---|---|---|
| EP | 0 995 700 | A1 | 4/2000 |
| EP | 1 029 815 | A1 | 8/2000 |
| EP | 1 268 319 | B1 | 3/2001 |
| EP | 1 495 997 | A1 | 1/2005 |
| EP | 495 997 | A1 | 1/2005 |
| FR | 2738805 | A1 | 3/1997 |
| GB | 2 290 513 | A | 3/1996 |

* cited by examiner

CONTAINER FILLING DEVICE

RELATED APPLICATIONS

This application claims priority from and incorporates by reference German patent application DE 10 2011 103 152.2 filed on May 25, 2011

FIELD OF THE INVENTION

The present invention relates to a device for filling containers, in particular bottles or beakers with food products, in particular liquid to paste-like dairy and fat products, juices, waters and similar, including an upper main element, a lower main element and lateral elements connecting the upper and the lower main element, a plurality of support elements arranged at one another without a continuous drive device, which support elements are run in an endless manner through the device past operating stations and along the main elements and the lateral elements, wherein an interconnection of the support elements with one another is disengaged due to the support elements being supported along at least one lateral element.

BACKGROUND OF THE INVENTION

Typically the containers to be filled according to the non related art are inserted into support elements which are connected with one another through a continuous feed device like a conveying chain and which are continuously run through the filling device. This drive mode is reliable and provides a permanent interconnection of the support elements with one another. The support elements can be accelerated and decelerated in a controlled manner, which is required in particular for high cyclic rates with which the support elements are moved through the filling device.

The non related art, however, also has substantial disadvantages which were so far accepted as necessary limitations when operating filling devices. One of the disadvantages is the chain which elongates during operation which makes positioning the containers below the particular operating stations difficult. Besides requiring frequent adaptation of the basic settings the chain elongation requires a separate positioning aide almost in every operating station in order to provide exact treatment for the containers.

Another essential disadvantage is caused by the required massive drive elements which have substantial weight and through which the masses to be accelerated of respectively configured drives require supports etc. Overall the machine itself is very heavy and a plurality of high quality and expensive components needs to be installed and disassembled and uninstalled or replaced during maintenance. This does not only cause substantial material and component expense during production and maintenance. Substantial production shortfalls have to be accepted when the equipment is maintained.

Therefore attempts were made again and again to design filling devices with a "chainless drive" since these at least in theory do not have many of the recited disadvantages.

The invention itself relates to a "chainless filling device" of this type wherein chainless means that the support elements are not arranged at one another through a continuously run drive member like e.g. a chain.

A device of this type is known from EP 1 495 997 A1 in various embodiments.

Besides embodiments in which the support elements are supported on rollers or wheels along the main elements, EP 1 495 997 B1 also discloses embodiments in which the support elements are moved on sliding rails along the main elements with the faces of the support elements contacting one another. In FIGS. 10 and 11 of EP 1 495 997 B1 lateral elements in the form of elevators are illustrated which move the support elements from the upper main element into the lower main element and back. Thus, a support element is a disengaged from a respective main element and an elevator receiver is coupled instead into the lateral element. The receiver includes a free space into which the subsequent support element is pressed during the next feed movement.

The lateral elements configured as an elevator have a significant advantage. With these lateral elements the support elements can be integrated into the lower main element without the topside of the support element provided for receiving the containers changing its orientation in the lower main element.

The solution sketched out in EP 1 495 997 B1, however, has a significant disadvantage. The interconnection between the cell plates is dissolved through the cell plate being disengaged at the end of the upper and/or lower main element. A controlled acceleration and a controlled deceleration of the cell plates arranged in the lower main element or upper main element is not provided anymore. The lower main element and the upper main element typically form the main elements of the device in which main elements operating stations can be arranged.

In the unpublished application PCT/DE2009/001752 of the applicant support elements are disclosed that are arranged on a frame wherein the frames are connected with one another through attachment elements associated with the frame, so that the interconnection of the support elements arranged in the main elements is maintained.

BRIEF SUMMARY OF THE INVENTION

Thus, it is the object of the invention to provide an alternative device for filling containers in which also support elements that are not connected with one another can be accelerated and decelerated in a controlled manner in the main elements.

The object of the invention is achieved through a device with the features of claim 1, in particular with the characterizing features according to which the interconnection of the support elements with one another in the upper main element and/or in the lower main element is maintained over the entire movement path along the main element and wherein the movement of support elements in the upper main element and/or lower main element can be accelerated and decelerated in a controlled manner, wherein the interconnection of the support elements is maintained.

The advantage of the device configured according to the invention is that maintaining the closed interconnection of the support elements not coupled with one another maintains controlled acceleration and deceleration of the support elements in the respective main element. In particular in view of the high accelerations and decelerations occurring at up to 60 feed cycles per minute in current filling devices it becomes apparent that only a "chainless" filling device configured according to the invention can achieve an objective of to the invention.

In a particularly advantageous embodiment it is provided that the controlled acceleration of the support elements is provided through a drive and the controlled deceleration is provided through a brake device, wherein it is provided in particular that the drive operates against the brake device and the interconnection of the support elements with one another is maintained through forces of the drive and brake device wherein the forces act opposite to one another.

Through using a drive and a brake device it is provided that none of the support elements disengages from the interconnection in one of the main elements and moves in an uncontrolled manner in the main element.

It is feasible to control the brake device in an active manner and to configure it as an eddy current brake impacting the support elements or as a servo motor impacting the support elements.

It is particularly advantageous when the drive impacts the first support element in feed direction and the brake device impacts the last support element of the main element in feed direction. In this embodiment it suffices for maintaining the interconnection of the support elements in the main elements to have a single drive and a single brake device.

The overreaching idea is that the support elements are kept in a pressed interconnection through the forces of drive device and brake device acting against one another.

As a consequence of the arrangement of drive device and brake device the respective lateral element transitions in front of the drive or behind the brake device into the upper- and/or lower main element. Through this configuration of the invention it is furthermore provided that the support elements can be moved between the main elements and the lateral elements independently from the required connection condition in the main elements.

It is particularly advantageous in view of the high acceleration- and deceleration forces that the drive and the brake device include an operating element engaging the respective support element in a form locking manner.

Thus it is preferred when the operating element is a gear which engages a gear rack of the support element in a form locking manner for providing controlled acceleration or deceleration. It is furthermore provided that the upper main element or the lower main element include down holders which prevent an upsetting of the support elements under a controlled acceleration or deceleration.

This is particularly important when the weight of the support elements does not suffice to support the acceleration and deceleration forces of the drive and the brake device.

Eventually it is provided for friction minimization that the support elements are run through the device on rollers.

BRIEF DESCRIPTION OF THE DRAWINGS

An improved understanding of the invention and of additional advantages and features can be derived from the subsequent description of an embodiment, with reference to drawing figures wherein.

DETAILED DESCRIPTION OF THE INVENTION

Figure 1:
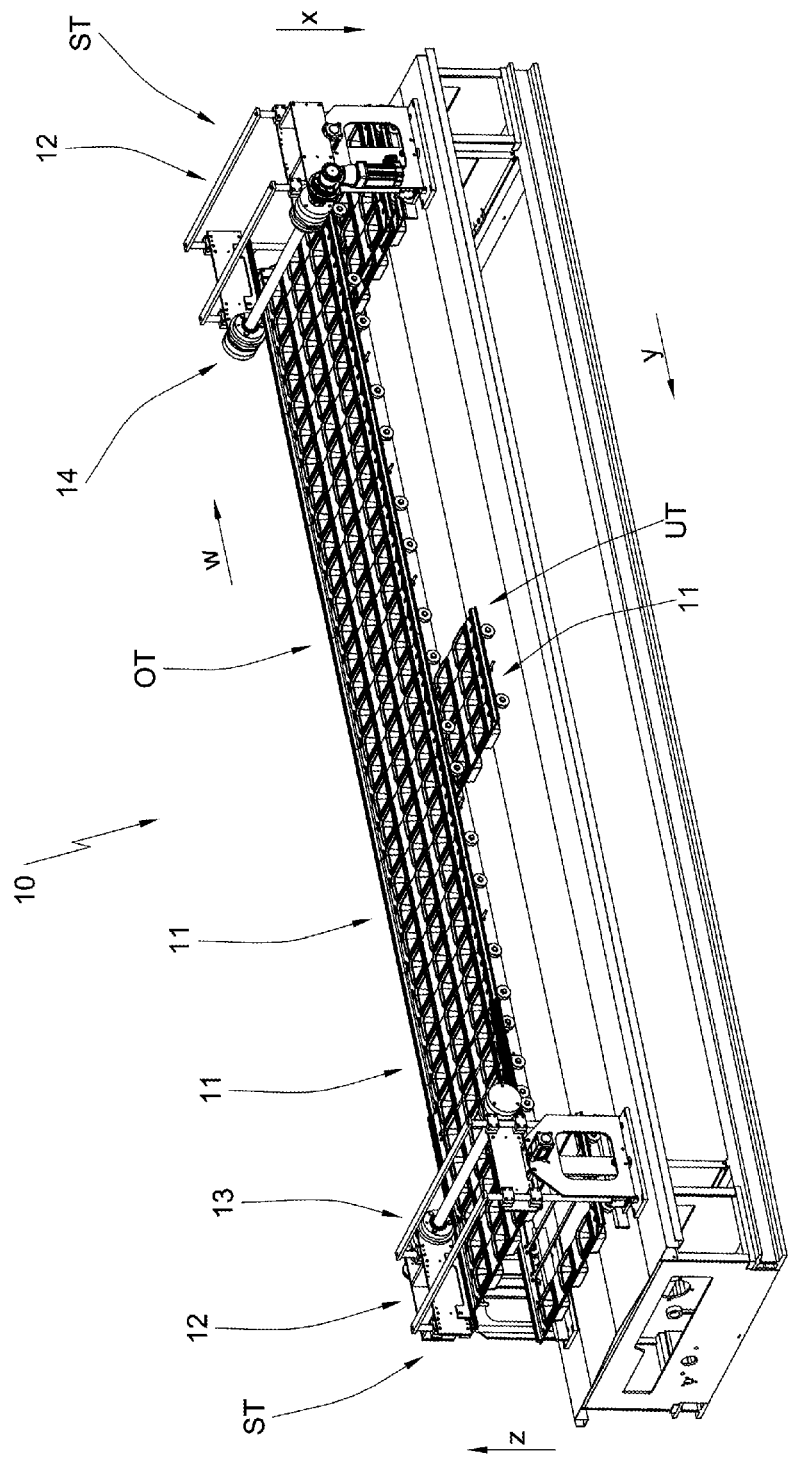
FIG. 1 illustrates a simplified overall view of the device according to the invention.

In the FIGs. a device according to the invention is designated overall with the reference numeral 10. The device 10 is a filling device for free flowing to pasty food products like e.g. margarine, milk products or juices.

The device 10 with respect to a placement surface includes a horizontal upper main element OT and a horizontal lower main element UT. The upper main element OT and the lower main element UT are subsequently also designated as main elements or main element. The upper main element OT and the lower main element UT are connected with one another through two lateral elements ST which are presently configured as elevators.

Along the elements OT, UT and ST particular carts 11 are continuously supported. These carts 11 are vertically moved from the upper main element OT into the lower main element UT and back by the elevators 12 forming the lateral elements ST. In particular it is implemented that each cart arranged in the upper main element OT is moved in the upper main element OT in feed direction W from the left elevator 12 in FIG. 1 along the operating stations which are not illustrated like sterilization, filling and sealing to the right elevator 12. Therein the elevator 12 moves the cart 11 in vertical direction X to the level of the lower main element UT where it is moved back in horizontal direction Y opposite to the direction W to the left elevator 12. Herein the cart 11 is received and moved in vertical direction Z, which is an opposite direction to the direction X, back into the upper main element OT.

A drive 13 is an element of the left elevator 12, a brake device 14 is an element of the right elevator. Each cart 11 is moved through the drive 13 in the direction W against the brake device 14 through the upper main element. As apparent from FIG. 1 the carts 11 arranged in the upper main element OT between the drive 13 and the brake device 14 form a closed interconnection. The lower main element UT does not include an interconnection of this type for the carts 11. The carts 11 are run in the lower main element UT without an interconnection.

The drive 13 and the brake device 14 define the upper main element OT. The upper main element OT starts in the direction W with the drive 13 and terminates in the direction W with the brake device 14. The lateral elements ST are connected upstream of the drive 13 or connected downstream of the brake device 14 wherein the carts 11 are vertically moved in X-direction or Z-direction from the upper main element OT into the lower main element UT and vice versa.

Figure 2:
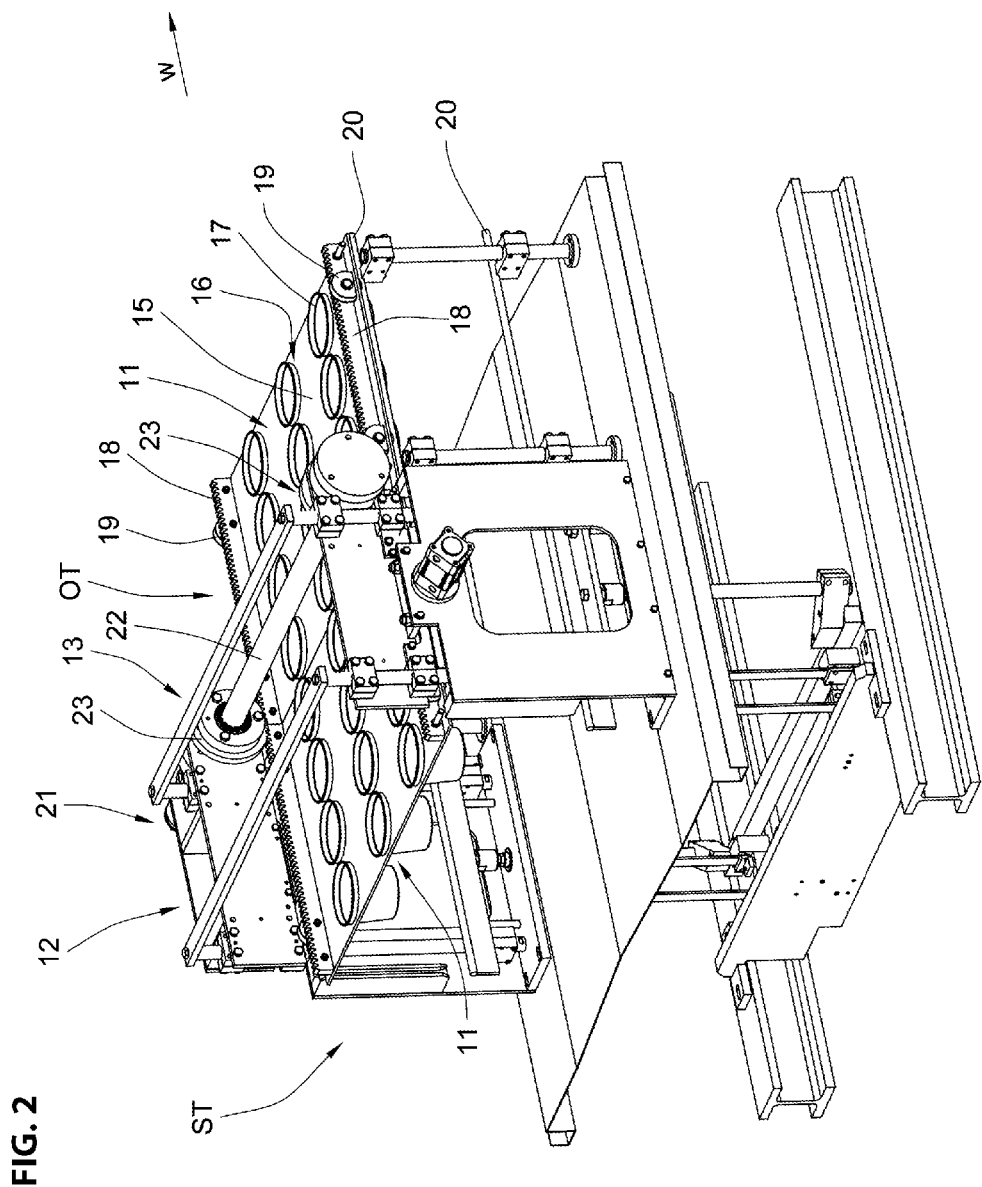
FIG. 2 illustrates a partial view of the device according to the invention.

FIG. 2 illustrates a partial view of the device 10 according to FIG. 1. This is the left lateral element ST with the drive 13. From this illustration the configuration of the particular carts 11 can be derived. These are plate shaped support elements 15 which are provided transversally to the feed direction with receivers 16 arranged in series adjacent to one another for particular containers 17, herein beakers. Each support element 15 includes plural receivers 16 arranged behind one another in feed direction W, X, Y and Z and forming tracks. Gear racks 18 are arranged in the lateral portions of the support elements that extend parallel to the feed direction, wherein the gear racks are configured with rollers 19.

The rollers 19 rest on running rails 20 of the upper main element OT and the lower main element UT and are pushed along the running rail 20 through the device 10 along the upper main element OT and the lower main element UT.

The drive 13 includes a motor 21 which drives two gears 23 connected with one another in rotation through an axis 22. The gears 23 engage the gear racks 18 of the carts 11 in order to accelerate them through the drive 13.

Figure 3:
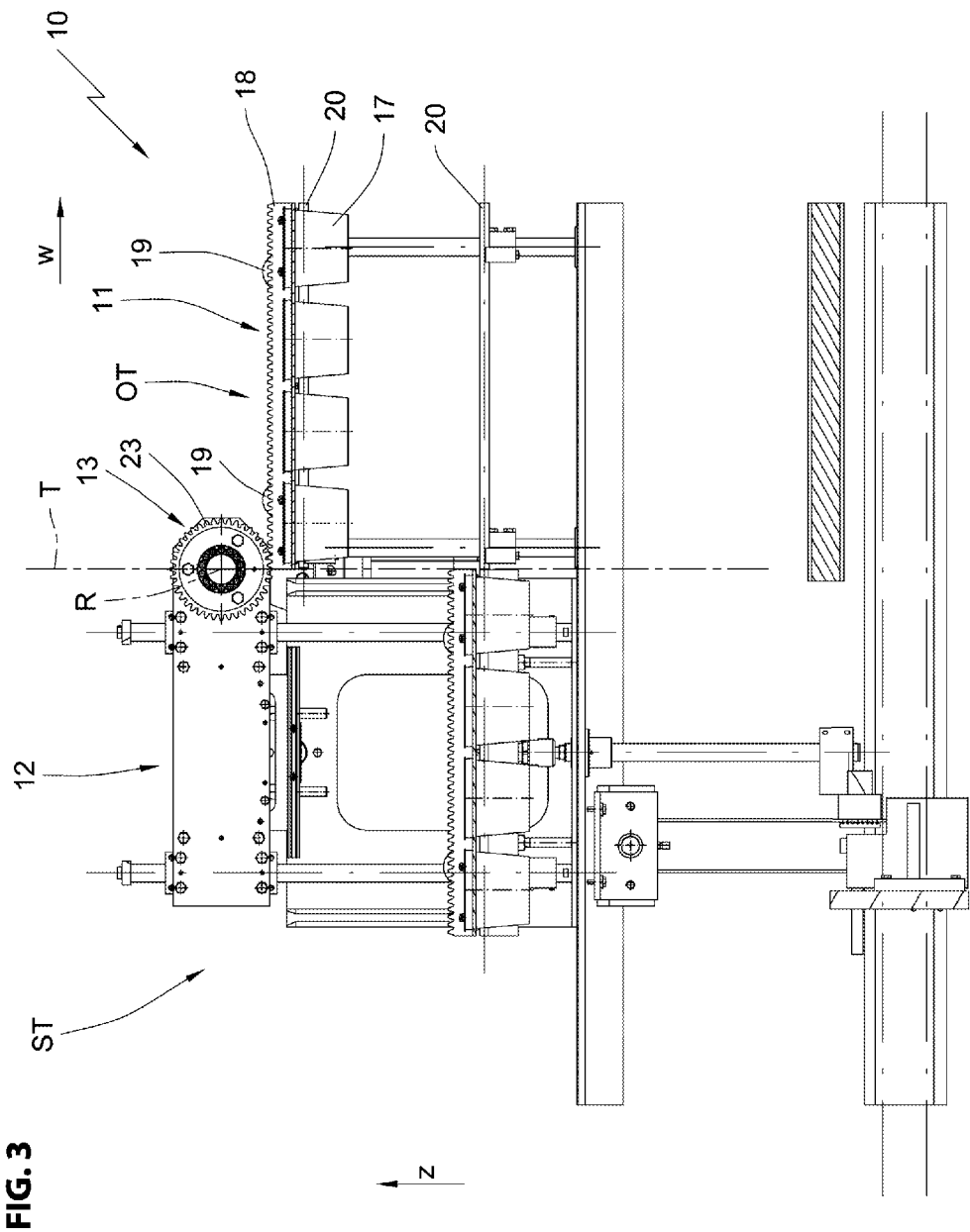
FIG. 3 illustrates a vertical sectional view of the device according to FIG. 2.

FIG. 3 illustrates a vertical sectional view through the device 10 according to FIG. 2. FIG. 3 consequently illustrates the left portion of the device 10 illustrated overall in FIG. 1. As can be derived from this figure, the rotation axis R of the axle 22 connecting the sprockets 23 is directly arranged in the vertical separation plane T between the lateral element ST and the lower main element UT.

Figure 4:
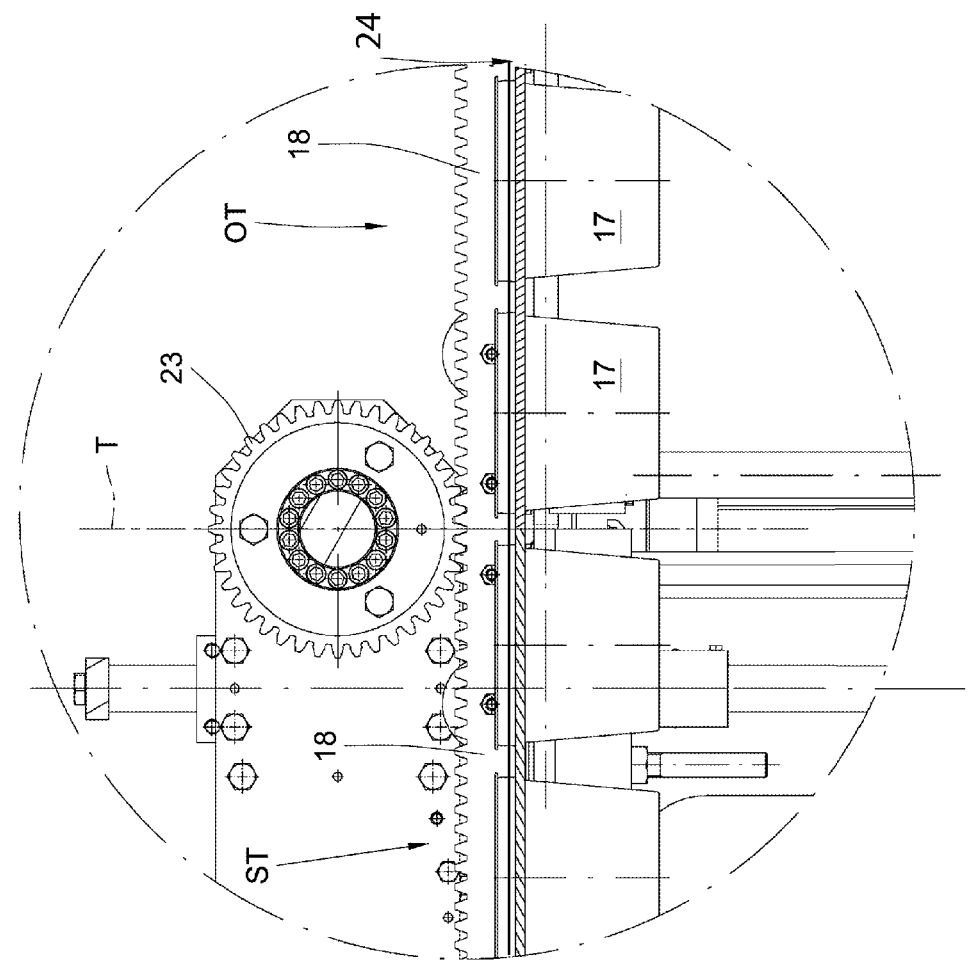
FIG. 4 illustrates an enlarged detail of the view according to FIG. 3.

A circumference of the gear 23 is sized so that it can engage the gear rack 18 of the first cart 11 of the upper main element OT in feed direction W and also the gear rack 18 of a cart 11 supported in the lateral element ST at a level of the upper main element OT. These features can be derived in particular from FIG. 4 which is an enlarged detail of FIG. 3 with a view of the gear 23.

Initially a cart 11 is moved from the horizontal plane of the lower main element UT into the horizontal plane of the upper main element OT. Thus, in feed direction W, this cart 11 is arranged in front of the first cart 11 of the upper main element OT. The gear 23 engages the gear rack 18 of the first cart 11 joined in the upper main element OT and also engages the recited cart 11 in the lateral element ST.

Through rotation of the gear, the cart 11 of the lateral element ST arranged at the level of the upper main element OT and the first cart 11 of the upper main element OT are moved in feed direction W. Thus, the respective first cart arranged in feed direction W pushes all other carts of the upper main element OT in feed direction W. Thus, the drive 13 facilitates a controlled acceleration of the cart 11 in the upper main element OT.

With this respect, the form locking engagement of the gear 23 into the gear rack 18 of the carts 11 is advantageous as well as the arrangement of the gear rack with respect to the setup plane of the device 10 above the gear racks 18. Thus, on the one hand side, there is the option to connect the cart 11 that is disposed in the lateral element ST from below in direction Z with the drive 13. On the other hand side, the running rail 20 of the upper main element OT below the gear 23 is configured as a thrust bearing. Therefore there is no risk that the gear racks 18 dive under the gear 23.

It is evident that the illustration of FIG. 3 is mirrored at a vertical axis which extends parallel to the separation plane T so that the gear 23 is arranged in feed direction W in front of the elevator 12 of the right lateral element ST illustrated in FIG. 1. Thus, the gear 23 of the brake device 14 impacts the last cart 11 of the upper main element OT in feed direction W, in particular through engaging its gear rack 18. The brake device 14 acts against the drive movement of the drive 13 in feed direction W. Thus it is provided that the carts 11 contact each other with their faces oriented towards each other in feed direction W or in feed direction Y. The brake device 14 can thus decelerate in a controlled manner against the feed movement of the drive 13.

Through the opposing forces of the drive 13 and the brake device 14, the carts 11 of the upper main element are kept in a compressed interconnection. Down holders 24 or supports receive the carts 11 between each other and the running rail 20 of the upper main element OT in order to prevent an upsetting of the carts through driving and braking forces oriented against one another.

The brake device 14 can be configured in an active manner and also in a passive manner. A passive brake device 14 includes a pre-defined deceleration force, wherein the deceleration force can have different strength over the feed movement of an operating stroke of the device 10. However, it is also conceivable and advantageous to provide an actively controlled brake device 14 which can be adapted preferably as a function of particular operating parameters during operations through an automatic control.

Overall a filling device for food products is described whose carts 11 form a coherent interconnection configured as a compressed interconnection in the upper main element OT over their entire movement W, so that they can be accelerated and decelerated in a controlled manner. The compressed interconnection is facilitated through a drive defining the beginning of the upper main element OT which acts against a brake device forming an end of the upper main element OT. The drive 13 and the brake device 14 thus frame the upper main element OT. This configuration is based on the presumption that the operating stations are arranged in the upper main element. It can be an equivalent solution to additionally or alternatively provide the brake device 14 and the drive 13 in the lower main element UT when a respective interconnection is required therein.

The elevators 12 which move the carts 11 in a vertical direction between the upper main element OT and the lower main element UT represent a particularity of the device 10 which facilitates removing the carts 11 from the device 10 in feed direction W without obstruction. This significantly facilitates so-called format change, thus using carts 11 with support elements 15 for containers 17 with other shapes and sizes, since no components of the lateral element ST have to be disassembled.

Another particularity of the device 10 is that the carts 11 are run without interconnection in the lower main element UT not provided with operating stations. This can be provided e.g. through a timing belt engaging the carts 11.

REFERENCE NUMERALS AND DESIGNATIONS

10 Device
11 Cart
12 Elevator
13 Drive
14 Brake Device
15 Support element
16 Receiver
17 Container
18 Gear Rack
19 Roller
20 Running Rail
21 Motor
22 Axle
23 Gear
24 Down Holder
OT Upper Main Element
UT Lower Main Element
ST Lateral element
R Rotation Axes
T Separation plane
W Direction
X Direction
Y Direction
Z Direction

What is claimed is:
1. A device for filling containers, the device comprising:
an upper main element;
a lower main element;
lateral elements connecting the upper main element and the lower main element; and
a plurality of support elements pressed in contact with one another in the main elements without a drive device continuously extending along the main elements,
wherein the support elements pressed in contact with one another are continuously movable through a filling device along the entire main elements,
wherein a continuously movable drive draws support elements in contact with support elements that are pressed in contact with one another in the main elements by the continuously movable drive, wherein the support elements are not pressed in contact with one another when supported in at least one lateral element, wherein the support elements are pressed in contact with one another in the upper main element or in the lower main element over an entire movement path along the entire upper main element or the entire lower main element, and wherein a movement of the support elements pressed in contact with one another in the upper main element or in the lower main element is acceleratable in a controlled manner by the continuously movable drive that is in form-locking engagement with an upstream support element and deceleratable in a controlled manner by a brake device that is in form-locking engagement with a downstream support element.

2. The device according to claim 1, wherein the brake device is controllable in an active manner and is configured as an eddy current brake or as a servo motor impacting the support elements.

3. The device according to claim 1, wherein the drive impacts a first support element on a main element in feed direction and the brake device impacts a last support element on a main element in feed direction.

4. The device according to claim 1, wherein the drive acts against the brake device and an interconnection of the support elements with one another is maintained through opposing forces of the drive and the brake device.

5. The device according to claim 1, wherein the respective lateral element transitions upstream of the drive or downstream of the brake device into the upper main element or the lower main element.

6. The device according to claim 1, wherein the drive and the brake device include an operating element that engages the respective support element in a form locking manner.

7. The device according to claim 6, wherein the operating element is a gear which engages a gear rack of the support element in a form locking manner for controlled acceleration or deceleration.

8. The device according to claim 1, wherein the upper main element or the lower main element include down holders which prevent a rising of the support elements during controlled acceleration or deceleration.

9. The device according to claim 1, wherein the support elements are moved through the device on rollers.

10. The device according to claim 2, wherein the drive impacts a first support element on a main element in feed direction and the brake device impacts a last support element on a main element in feed direction.

11. The device according to claim 1, wherein the respective lateral element transitions upstream of the drive or downstream of the brake device into the upper main element and the lower main element.

12. The device according to claim 1, wherein the upper main element and the lower main element include down holders which prevent a rising of the support elements during controlled acceleration or deceleration.

13. A device for filling containers, the device comprising:
an upper main element;
a lower main element;
lateral elements connecting the upper main element and the lower main element; and
a plurality of support elements pressed in contact with one another in the main elements without a drive device continuously extending alone the main elements, wherein the support elements pressed in contact with one another are continuously movable through a filling device along the entire main elements, wherein a continuously movable drive draws support elements in contact with support elements that are pressed in contact with one another in the main elements by the continuously movable drive, wherein the support elements are not pressed in contact with one another when supported in at least one lateral element, wherein the support elements are pressed in contact with one another in the upper main element and in the lower main element over an entire movement path along the entire upper main element or the entire lower main element, and wherein a movement of the support elements pressed in contact with one another in the upper main element and in the lower main element is acceleratable in a controlled manner by the continuously movable drive that is in from-locking engagement with an upstream support element and deceleratable in a controlled manner by a brake device that is in form-locking engagement with a downstream support element.

* * * * *